May 13, 1930.  H. O. WICKES  1,758,873
HOLDING DEVICE
Filed July 17, 1929

Inventor.
H. O. WICKES
By Victor J. Evans
Attorney.

Patented May 13, 1930

1,758,873

UNITED STATES PATENT OFFICE

HARVEY O. WICKES, OF CASTELLA, CALIFORNIA

HOLDING DEVICE

Application filed July 17, 1929. Serial No. 379,044.

This invention relates to improvements in holding devices and has particular reference to a device for holding bowls and the like receptacles, wherein a commodity is to be mixed.

The principal object of this invention is to produce a device which may be readily attached to a table top or other relatively immovable object and upon which device the bowl may be quickly clamped so as to be held against movement.

Another object is to produce a device which is simple in construction.

A further object is to produce a device which is sanitary in that it prevents spilling of the contents of the bowl being held.

A still further object is to provide means whereby the bowl may be quickly clamped in the device or removed therefrom.

Other objects and advantages will be apparent during the course of the following description.

Figure 1:
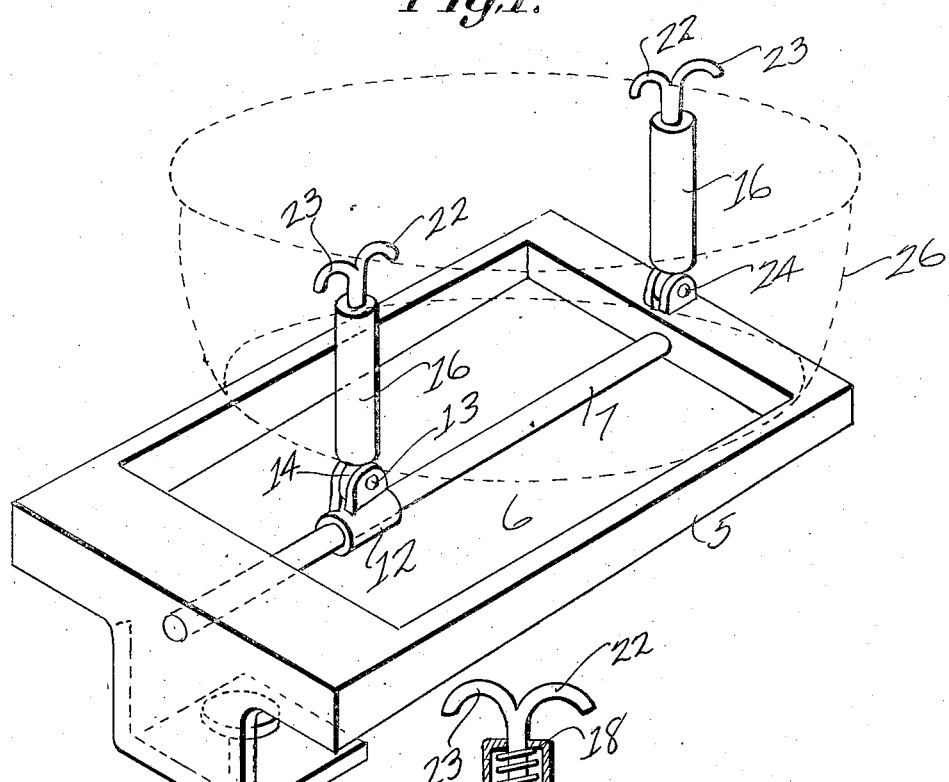
Figure 2:
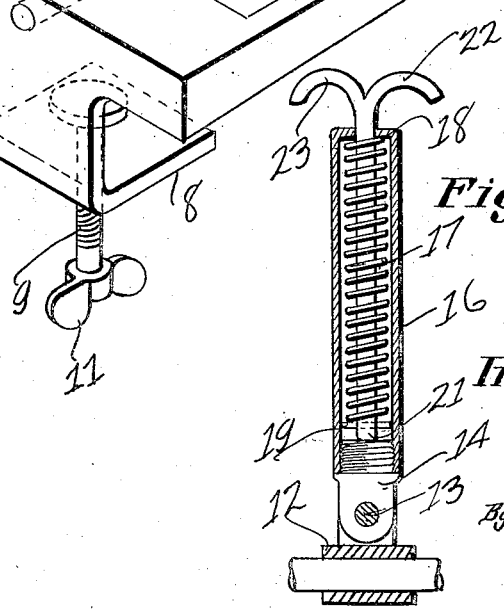

In the accompanying drawings forming a part of this specification and in which like numerals are employed to designate like parts throughout the same, Figure 1 is a perspective view of my device, and Figure 2 is an enlarged detail cross section of one of the bowl holding elements.

It is common to mix ingredients in a mixing bowl which is held in one hand while the other hand is used for the mixing operation. The result is that only one hand is useable with the result that it causes a severe strain upon the user. By employing applicant's device both hands may be used for the mixing operation.

In the accompanying drawings wherein for the purpose of illustration is shown a preferred embodiment of my invention, the numeral 5 designates a rectangular base plate having an opening 6 thereof. This base plate carries a rod 7 extending the length of the opening 6. A bracket is shown at 8 which carries a clamped screw 9 turned through the medium of a wing nut 11. Slidable upon the rod 7 is a slider 12 which has hingedly attached as at 13 a plug 14 upon which is secured a barrel 16. This barrel serves to house a spring 17 one end of which engages the end of the barrel as at 18 and the opposite end engages a pin 19 extending through the shank 21 of the hooked element 22. This hooked element is provided with a finger hook 23 the purpose of which will be later seen. A similar holding device is pivoted as at 24 to the frame 5 and as the construction is identical further comment thereon is unnecessary. A mixing bowl is shown on dotted lines of 26.

Assuming that the device is in use, the plate 5 is rested upon a table and the wing nut 11 rotated so as to cause the screw 9 to clamp against the table. A mixing bowl is then placed upon the device and the finger hold 23 of the rear holding element is engaged and an upward pull against the spring 17 permits the hooked element 22 to engage the edge of the bowl. The second holding element is moved along the rod 7 until it is in alignment with the edge of the bowl, after which an upward pull upon the finger hold 23 permits the hook 22 to engage the side of the bowl.

It will thus be seen that the bowl will be securely held in fixed position by the device above described.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described a rectangular plate, clamping means secured to one end of said plate, said clamping means comprising a pivoted barrel, a hook element positioned in said barrel and a spring positioned within said barrel and surrounding said hook element, a rod horizontally positioned in said frame, a sliding fastening element movable on said rod, said fastening element comprising a pivoted barrel, a horizontal element positioned in said barrel, a spring surrounding said horizontal element, said springs and said barrels serving to hold said horizontal elements against withdrawal from said barrel whereby a receptacle positioned on said frame and between said horizontal elements may be engaged thereby, for the purpose specified.

In testimony whereof I affix my signature.

HARVEY O. WICKES.